United States Patent
You et al.

(10) Patent No.: US 9,452,731 B2
(45) Date of Patent: Sep. 27, 2016

(54) MOUNTING APPARATUS FOR BUCKLE TRANSMISSION APPARATUS

(71) Applicant: AUTOLIV DEVELOPMENT AB, Vårgårda (SE)

(72) Inventors: Byoung Gae You, Hwaseong-si (KR); Ik Su Kim, Hwaseong-si (KR); Sang Hun Park, Hwaseong-si (KR); Dae Sung Kim, Wonju-si (KR)

(73) Assignee: AUTOLIV DEVELOPMENT AB, Vargarda (SE)

( * ) Notice: Subject to any disclaimer, the term of this patent is extended or adjusted under 35 U.S.C. 154(b) by 0 days.

(21) Appl. No.: 14/879,137

(22) Filed: Oct. 9, 2015

(65) Prior Publication Data
US 2016/0101761 A1  Apr. 14, 2016

(30) Foreign Application Priority Data
Oct. 10, 2014 (KR) .................. 10-2014-0136707

(51) Int. Cl.
*B60R 22/22* (2006.01)
(52) U.S. Cl.
CPC ...................... *B60R 22/22* (2013.01)
(58) Field of Classification Search
CPC .................................................. B60R 22/22
See application file for complete search history.

(56) References Cited

U.S. PATENT DOCUMENTS

| | | | | |
|---|---|---|---|---|
| 3,363,712 A * | 1/1968 | Fontaine | ............... | B60R 22/343 180/270 |
| 4,818,022 A * | 4/1989 | Nishimura | ............... | B60N 2/06 280/804 |
| 5,031,961 A * | 7/1991 | Isern | ...................... | B60R 22/26 280/804 |
| 5,123,673 A * | 6/1992 | Tame | ...................... | B60R 22/03 100/268 |
| 7,195,311 B2 * | 3/2007 | Kuliha | .................. | B60N 2/071 297/216.1 |
| 2003/0010560 A1 * | 1/2003 | Motozawa | .......... | B60R 22/1951 180/268 |
| 2014/0237776 A1 * | 8/2014 | Sterner | ............. | A44B 11/2553 24/163 R |

FOREIGN PATENT DOCUMENTS

| JP | 2007112424 A | * | 5/2007 |
|---|---|---|---|
| JP | 2010036735 A | * | 2/2010 |

* cited by examiner

*Primary Examiner* — Darlene Condra
(74) *Attorney, Agent, or Firm* — Stephen T. Olson; Harness, Dickey & Pierce, P.L.C.

(57) ABSTRACT

Provided is a mounting apparatus for a buckle transmission apparatus. The mounting apparatus includes a mounting bracket to couple the buckle transmission apparatus, which comprises a transmission cable coupled to a buckle head and a driving unit coupled to the transmission cable to transmit the buckle head to a required position, to a vehicle body, and a cover member provided under the buckle head, allowing the transmission cable to pass the cover member, and fitted into an internal structure of a vehicle.

3 Claims, 8 Drawing Sheets

MOUNTING APPARATUS FOR BUCKLE TRANSMISSION APPARATUS

CROSS-REFERENCE TO RELATED APPLICATIONS

This application claims the benefit and priority of Korean Patent Application No. 10/2014//0136707 filed 10 Oct. 2014. The entire disclosure of the above application is incorporated herein by reference.

FIELD

The present invention relates to a buckle transmission apparatus capable of transmitting a buckle of a vehicle seat belt system to a predetermined position.

BACKGROUND

In general, a seat belt buckle transmission apparatus for a vehicle, which raises a buckle head from a lower holding position to an upper presenting position before a belt tongue is fixed to the buckle head of a seat belt.

The seat belt buckle transmission apparatus allows an occupant to conveniently insert the belt tongue of a seat belt into a buckle in the upper presenting position. After the belt tongue is inserted into the buckle head, the buckle head returns to the lower holding position from the upper presenting position so that the buckle head is maintained in the lower holding position while the occupant stays in a vehicle.

The buckle head is locked in the lower holding position so that the occupant wearing the seat belt can be prevented from suddenly moving toward a front of the vehicle, and the buckle head can be prevented from being raised.

In addition, when a dangerous situation, such as vehicle crash, is detected, the seat belt buckle transmission apparatus more lowers the buckle head to a confining position from the lower holding position, so that the belt tongue inserted into the buckle head may be instantly pulled.

The buckle transmission apparatus is installed adjacent to a vehicle seat. For example, the buckle transmission apparatus is installed in a vehicle seat frame or a vehicle body.

SUMMARY

Technical Problem

An object of the present invention provides an apparatus for a buckle transmission apparatus, capable of improving mounting workability of the buckle transmission apparatus.

Another object of the present invention provides a mounting apparatus for a buckle transmission apparatus, capable of preventing a cover member of the buckle transmission apparatus from being moved while the buckle transmission apparatus coupled to a buckle head is transmitted to a predetermined position.

Technical Solution

According to one embodiment of the present invention, there is provided a mounting apparatus for a buckle transmission apparatus. The mounting apparatus may include a mounting bracket to couple the buckle transmission apparatus, which comprises a transmission cable coupled to a buckle head and a driving unit coupled to the transmission cable to transmit the buckle head to a required position, to a an internal side panel of a vehicle; and a cover member provided under the buckle head, allowing the transmission cable to pass the cover member, and fitted into a floor cover structure covering a floor of the vehicle, wherein the floor cover structure may be formed therein with a cover hole into which the cover member is fitted, the cover member may comprise a locking member locked to the floor cover structure; and the locking member may comprise: a fixing rib protruding laterally from one side of the cover member such that when the cover member is inserted into the cover hole, the fixing rib comes into close contact with an inner surface of the floor cover structure; and a locking hook protruding downwardly from an opposite side of the cover member, formed moveably toward an insertion portion of the cover member, and having a locking step formed at a lower end thereof to be locked to the inner surface of the floor cover structure.

Wherein the cover member may comprise a flange part having a shape corresponding to an outer surface of a peripheral portion of the cover hole of the floor cover structure; the fixing rib protrudes laterally from a bottom surface of one side of the flange part; and the locking hook protrudes downwardly from the bottom surface of an opposite side of the flange part.

An extensible tube may be interposed between the buckle head and the cover member, and may be provided at a lower end thereof with a locking protrusion locked to an inner circumference of an insertion hole formed in the cover member.

Advantageous Effects

As described above, according to one embodiment of the present invention, the mounting structure coupled to the vehicle body can be simplified, and the mounting work can be easily performed.

According to another embodiment of the present invention, while the buckle transmission apparatus coupled to the buckle head is moved to the desirable position, the cover member can be prevented from being moved. Accordingly, the transmission operation can be conveniently performed, and the buckle transmission apparatus may be in the standby state for the instant mounting into the vehicle body.

DETAILED DESCRIPTION

Hereinafter, an embodiment according to the present invention will be described in more detail with reference to accompanying drawings. The present invention is not limited to the following embodiments but includes various applications and modifications. The embodiments will make the disclosure of the present invention complete, and allow those skilled in the art to completely comprehend the scope of the present invention.

Hereinafter, directions, in which a transmission cable is transmitted in a housing, are defined as a forward direction F and a rearward direction R, and the directions substantially perpendicular to the forward and rearward directions F and R are defined as an upper direction U and a downward direction D, respectively.

Figure 1:
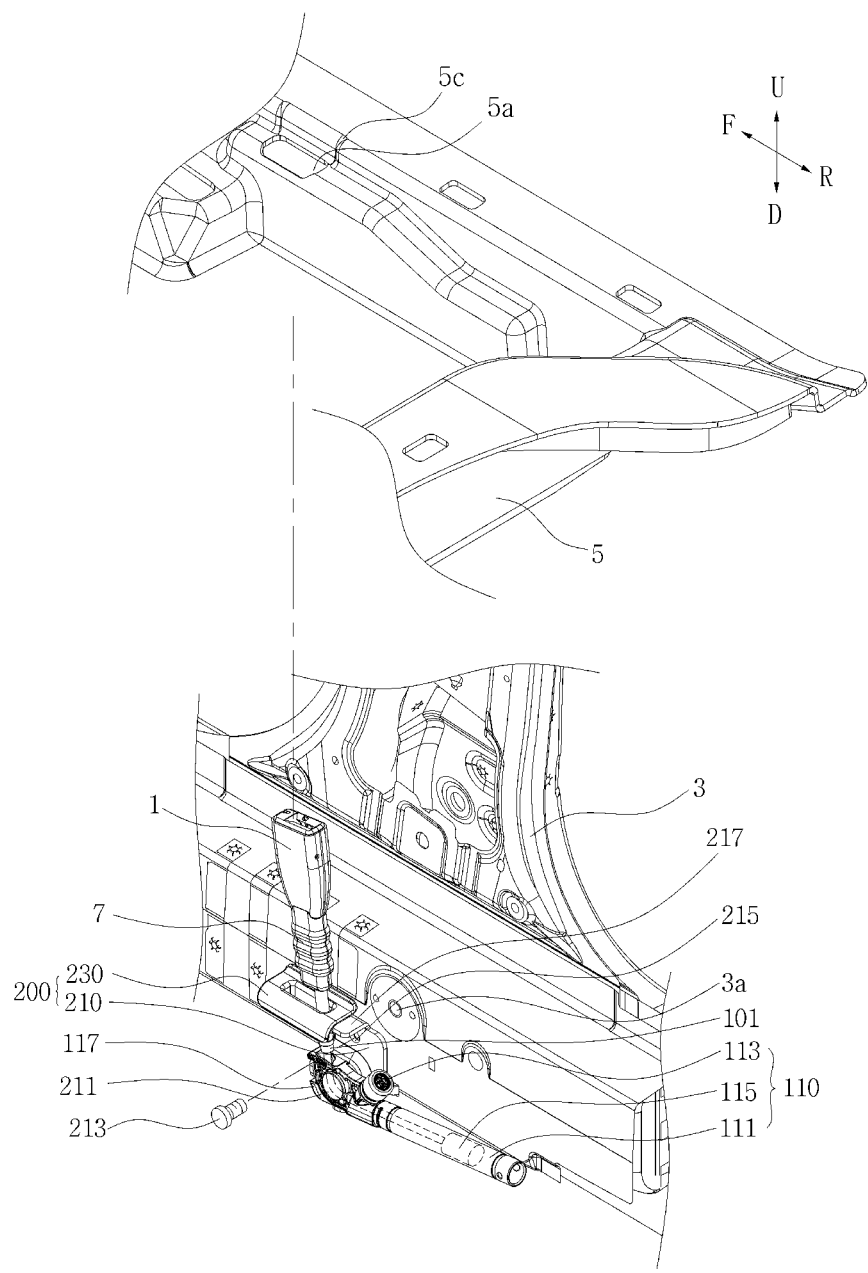
FIG. 1 is a perspective view showing the structure of a portion of a housing in a buckle transmission apparatus according to one embodiment of the present invention.

FIG. 1 is a perspective view showing the structure of a portion of a housing in a buckle transmission apparatus 100 according to one embodiment of the present invention.

Referring to FIG. 1, the buckle transmission apparatus 100 may be formed to support a buckle head 1, which is coupled to a vehicle seat belt tongue, so that the buckle head 1 is movable among an extension position, a conduction position, or a confining position. The vehicle seat belt tongue (not shown) is inserted and locked into a buckle head 1.

At the conduction position, the buckle head 1 is locked to the belt tongue so that an occupant is confined by a seat belt.

At the extension position, the occupant may easily recognize the buckle head 1, and easily couple the belt tongue to the buckle head 1.

At the confining position, the seat belt is pulled right before dangerous situations, such as emergency brake or slip, to protect the occupant.

The buckle transmission apparatus 100 includes a transmission cable 101 having one end coupled to the buckle head 1 and a driving unit 110 to drive the transmission cable 101.

According to one embodiment, the driving unit 110 may include a housing 111, a gas generator 113, and a piston 115. The gas generator 113 generates gas upon vehicle crash.

The housing 111 is provided therein with a piston 115, and coupled to the gas generator 113. The housing 111 may be formed to guide the gas generated from the gas generator 113 to the piston 115.

The piston 115 is coupled to an opposite end of the transmission cable 101 to transmit the transmission cable 101.

The driving unit 110 further includes a direction changing member 117 provided at a front end of the housing 111 to change linear movement of the transmission cable 101 from the linear movement in a front-rear direction F and R to the linear movement in an up-down direction U and D, or from the linear movement in the up-down direction U and D to the linear movement in the front-rear direction F and R. The direction changing member 117 may be provided integrally with the housing 111. According to another embodiment, the direction changing member 117 may be provided separately from the housing 111.

According to another embodiment, the driving unit 110 of the buckle transmission apparatus 100 may include a motor provided inside or outside the housing 111 to generate power, or a gear assembly coupled to the motor and the opposite end of the transmission cable 101.

The gear assembly may include the combination of various types of gears, such as a rack gear, a pinion gear, a spindle shaft, a spindle nut provided on an outer circumference of the spindle shaft, a worm gear, and a worm wheel gear.

The buckle transmission apparatus 100 is mounted at a predetermined position of an interior of a vehicle by a mounting apparatus 200.

The mounting apparatus 200 includes a mounting bracket 210 to couple the driving unit 110 of the buckle transmission apparatus 100 to a vehicle body 3 and a cover member 230 provided under the buckle head 1 and allowing the transmission cable 101 to pass therethrough.

The vehicle body 3 includes an internal side panel of the vehicle. According to another embodiment, the vehicle body 3 may include a vehicle seat frame.

The mounting bracket 210 is coupled to the driving unit 110 through a coupling member 211, such as a rivet. The mounting bracket 210 may be coupled to the direction changing member 117 through a riveting scheme by the coupling member 211.

The mounting bracket 210 is formed therein with a coupling hole 215 through which a coupling bolt 213 passes. The coupling bolt 213 is fixed to the vehicle body 3 by passing through the coupling hole 215 of the mounting bracket 210. The vehicle body 3 is formed therein with a fixing hole 3a into which the coupling bolt 213 is fixed.

A support protrusion 27, which supports the cover member 230, protrudes from an upper end of the mounting bracket 210.

The cover member 230 is formed to be coupled to an internal structure of the vehicle, for example a floor cover structure 5 to cover an interior floor of the vehicle. The floor cover structure 5 is installed on the interior floor of the vehicle. For example, the floor cover structure 5 may have various floor cover shapes such as a molded carpet.

The buckle head 1 is provided at a lower portion thereof with an extensible tube 7. The transmission cable 101 passes through an inner part of the extensible tube 7. The extensible tube 7 is extended or contracted depending on the transmission direction of the buckle head 1.

Figure 2:
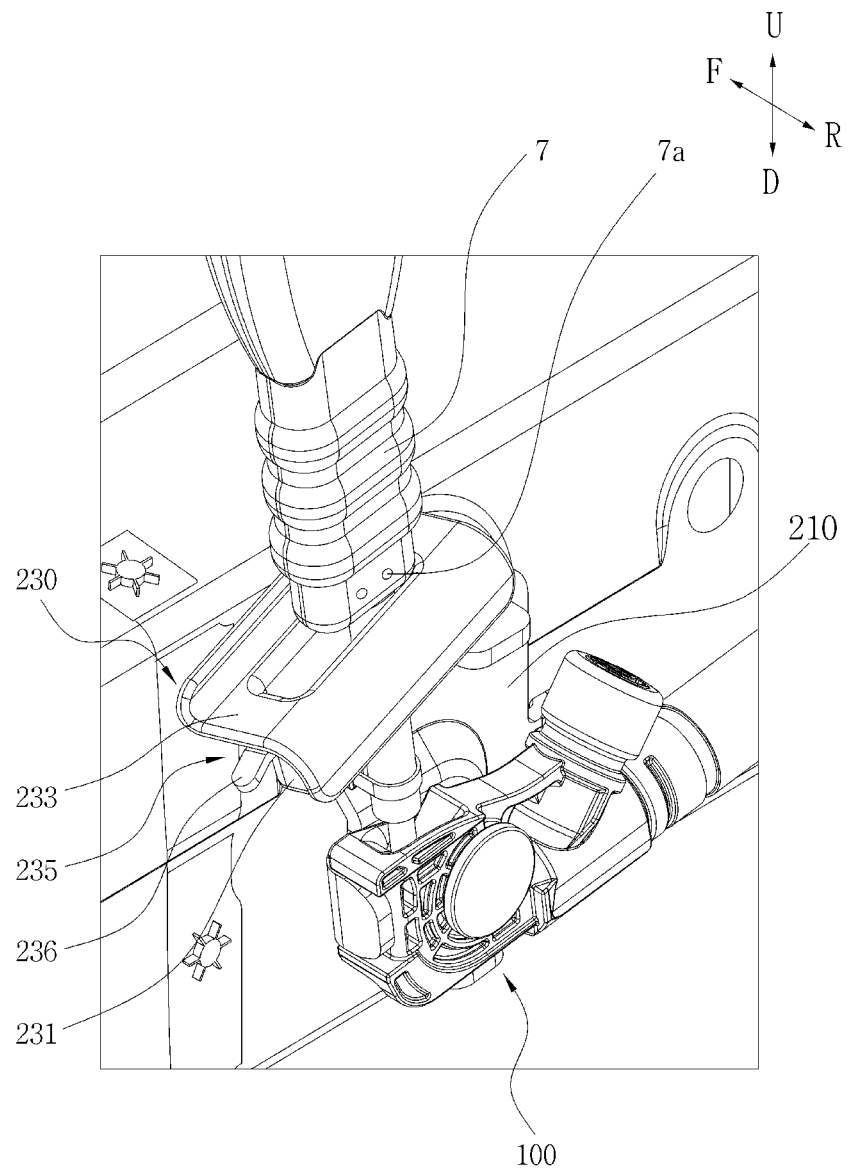
FIG. 2 is an enlarged view showing the structure of a cover member according to one embodiment of the present invention.
Figure 3:
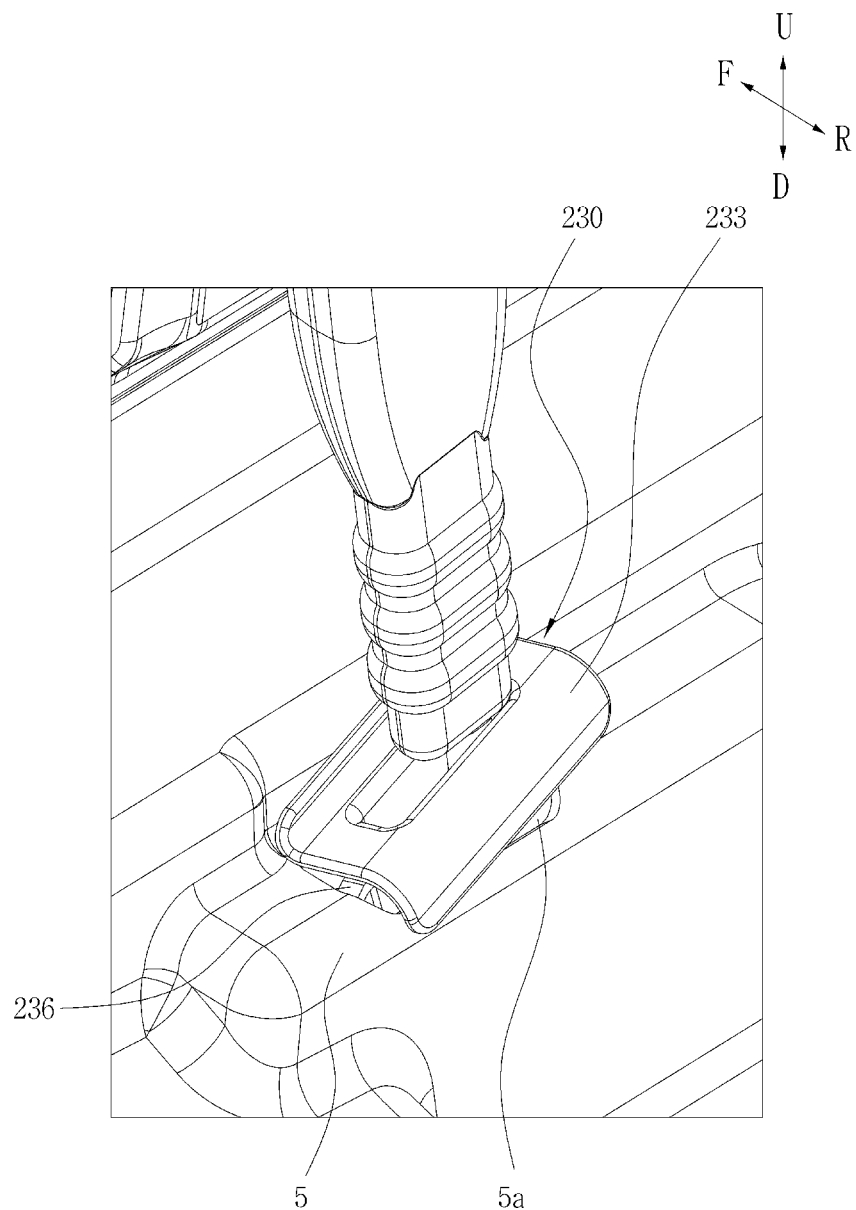
FIG. 3 is a perspective view showing the state that one side of the cover member is inserted into a floor cover structure according to one embodiment of the present invention.
Figure 4:
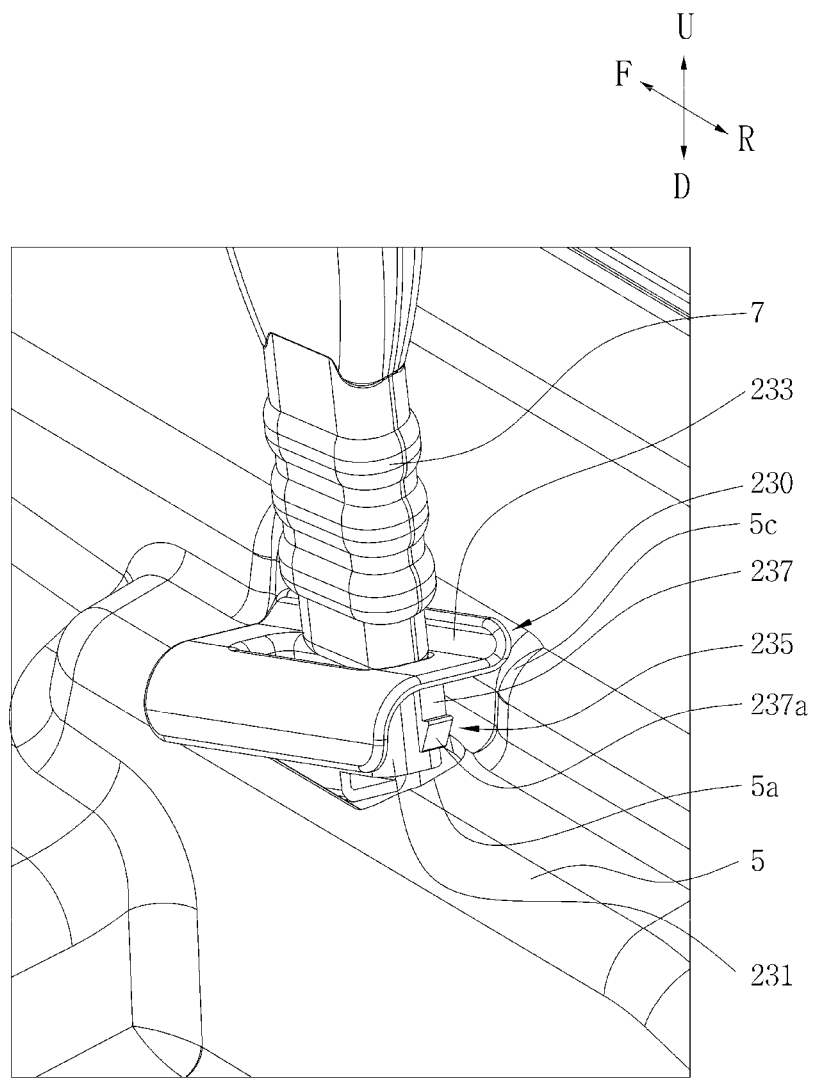
FIG. 4 is a perspective view showing a state that an opposite side of the cover member is inserted into the floor cover structure according to one embodiment of the present invention.

FIG. 2 is an enlarged view showing the structure of the cover member according to one embodiment of the present invention. FIG. 3 is a perspective view showing the state that one side of the cover member is inserted into the floor cover structure according to one embodiment of the present invention. FIG. 4 is a perspective view showing a state that an opposite side of the cover member is inserted into the floor cover structure according to one embodiment of the present invention.

Referring to FIGS. 2 to 4, the cover member 230 includes an insertion part 231 inserted into a cover hole 5a (see FIGS. 2 and 4) of the floor cover structure 5 and a flange part 233 extending on an upper end of the insertion part 231 and provided adjacent to a peripheral portion of the cover hole 5a of the floor cover structure 5.

A slit hole 5c extends at a peripheral portion of the cover hole 5a of the floor cover structure 5, so that the cover member 230 of the buckle transmission apparatus 100 and the buckle head 1 may be easily withdrawn out of the floor cover structure 5 through the cover hole 5a.

The flange part 233 of the cover member 230 has a shape substantially corresponding to the shape of the floor cover structure 5. The insertion part 231 may have a substantially quadrangle hollow tube shape. Since the flange part 233 has a shape corresponding to the outer surface of the floor cover structure 5, when the cover member 230 is inserted into the floor cover structure 5, the cover member 230 comes into close contact with the floor cover structure 5. Accordingly, the cover member 230 is firmly coupled to the floor cover structure 5.

The cover member 230 includes a locking member 235 locked into the floor cover structure 5. The locking member 235 includes a fixing rib 236 (see FIG. 2) protruding from one side of the cover member 235 and a locking hook 237 (see FIG. 4) protruding downward from an opposite side of the cover member 230.

The fixing rib 236 is formed to be locked in substantially parallel to an inner surface of the floor cover structure 5 in the state that the cover member 230 is inserted into the cover hole 5a of the floor cover structure 5. The fixing rib 236 may protrude from an inner bottom surface of the flange part 233 of the cover member 230.

The locking hook 237 protrudes downward from the cover member 230, and is provided at a lower end thereof with a locking step 237a locked to an inner part of the floor cover structure 5. The locking hook 237 perpendicularly protrudes from a bottom surface of the flange part 233 of the cover member 230. The locking hook 237 is substantially spaced apart from the insertion part 231 of the locking hook 237 by a predetermined interval. Through the above structure, the locking hook 237 is moved toward the insertion part 231 when the locking hook 237 is inserted. After the insertion of the locking hook 37 has been finished, the locking hook 237 returns to an original position thereof, so that the locking step 237a is locked to the inner surface of the floor cover structure 5.

As described above, since the cover member 230 includes the fixing rib 236 protruding laterally from one side of the cover member 236 and the locking hook 237 protruding downwardly from other side of the cover member 230, being formed moveably toward the insertion portion 231 of the cover member 230, and having a locking protrusion 237a formed at the lower end thereof, the cover member 230 can be firmly fixed to the floor cover structure 5 and while being easily inserted into the floor cover structure 5. In other words, the fixing rib 236 comes into close contact with the floor cover structure 5 without a movement, thereby firmly fixing the cover member 230 to the floor cover structure 5. The locking hook 237 is movably configured, thereby easily inserting the cover member 230 into the cover hole 5a of floor cover structure 5.

A pressed protrusion 7a protrudes from a lower portion of the extensible tube 7 so that the pressed protrusion 7a is pressed with respect to the inner surface of the insertion part 231 of the cover member 230. When a lower end of the extensible tube 7 is fitted into an upper inner circumference of the insertion part 231 of the cover member 230, the pressed protrusion 7a is pressed with respect to the upper inner circumference of the insertion part 231. Accordingly, when the buckle transmission apparatus 100 is transmitted, the cover member 230 can be prevented from being rotated about the transmission cable 101 or moved in a longitudinal direction of the transmission cable 101, so that the transmission work can be easily performed.

The cover member 230 can be prevented from being moved as described above, so that the buckle transmission apparatus 100 can be more easily mounted on the vehicle body 5 or the internal structure of the vehicle.

Hereinafter, a procedure of mounting the buckle transmission apparatus 100 at a predetermined position of the interior of the vehicle through the mounting device 200 according to the present invention will be described.

Figure 5:
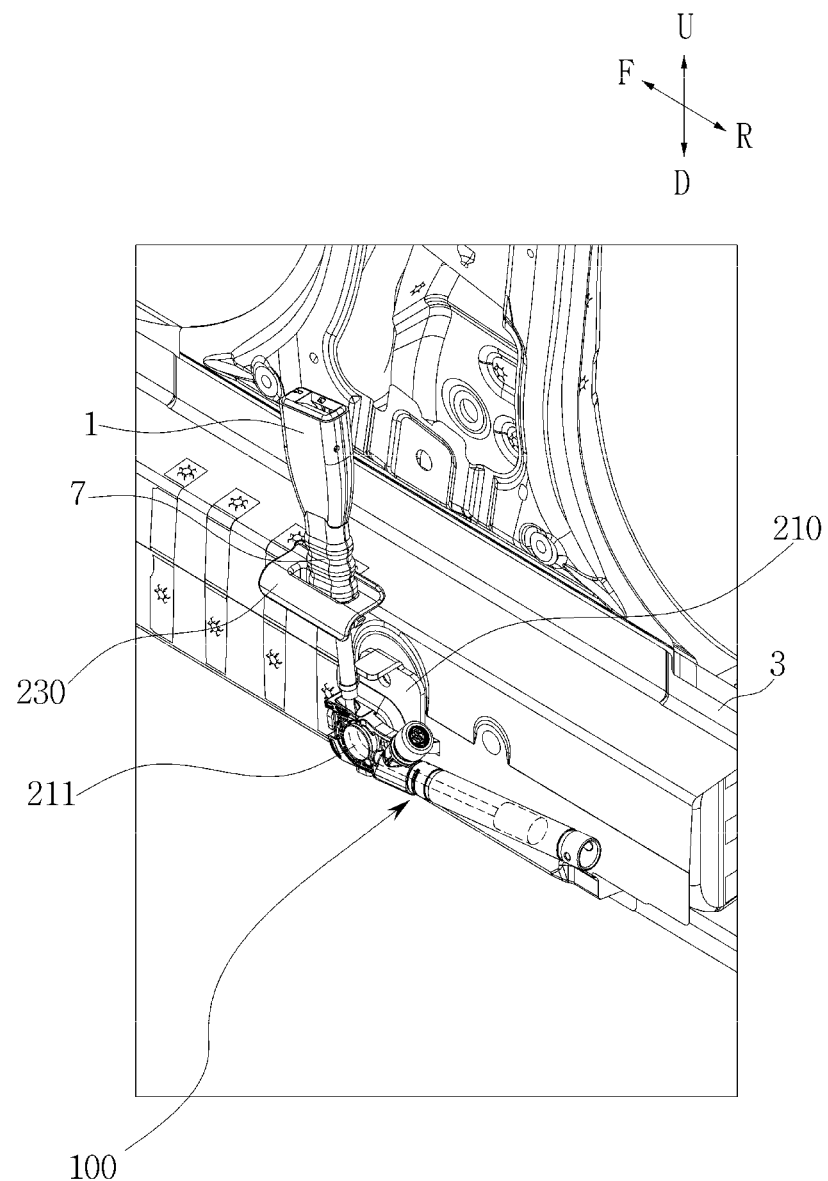
FIG. 5 is a perspective view showing the state that the buckle transmission apparatus according to one embodiment of the present invention is positioned adjacent to the position of the vehicle body for the mounting of the buckle transmission apparatus.

FIG. 5 is a perspective view showing the state that the buckle transmission apparatus 100 according to one embodiment of the present invention is positioned adjacent to the position of the vehicle body for the mounting of the buckle transmission apparatus 100.

Referring to FIGS. 2 and 5, the buckle transmission apparatus 100 coupled to the buckle head 1 is moved to a predetermined position of the vehicle body 3 for the mounting of the buckle transmission apparatus 100.

In this case, the mounting bracket 210 is coupled to the driving unit 110 of the buckle transmission apparatus 100 using the coupling member 211, such as a rivet, and the lower end of the extensible tube 7 is inserted into the insertion part 231 of the cover member 230.

When the extensible tube 7 is inserted into the insertion part 231 of the cover member 230, the locking protrusion 7a formed at the lower portion of the extensible tube 7 is pressed with respect to the inner surface of the insertion part 231 of the cover member 230. Accordingly, the cover member 230 can be prevented from being rotated about the transmission cable 101 or moved in the longitudinal direction of the transmission cable 101, so that the cover member 230 is confined at a predetermined position. Therefore, the buckle head 1 coupled to the buckle transmission apparatus 100 can be smoothly transmitted, and the buckle transmission apparatus 100 can be in the standby state for the instant mounting into the vehicle body 3.

After the buckle transmission apparatus 100 coupled to the mounting bracket 210 is moved to the predetermined position of the vehicle body 3 as described above, the coupling hole 217 of the mounting bracket 210 is aligned corresponding to the fixing hole 3a (see FIG. 1) formed in the vehicle body 3.

Figure 6:
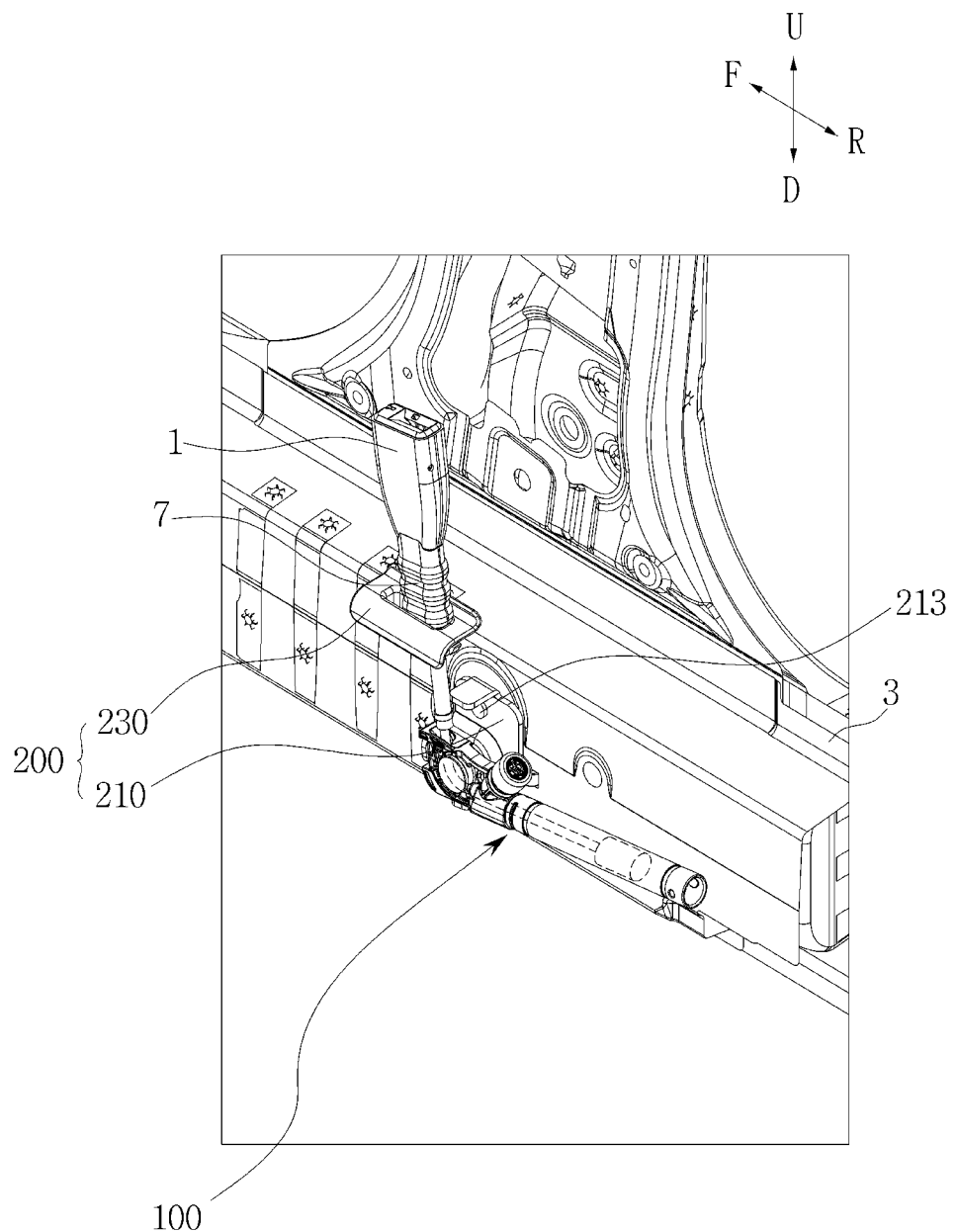
FIG. 6 is a view showing the state that the buckle transmission apparatus is coupled to the vehicle body according to one embodiment of the present invention.

FIG. 6 is a view showing the state that the buckle transmission apparatus 100 is coupled to the vehicle body according to one embodiment of the present invention.

Referring to FIG. 6, coupling bolts 213 are coupled to the coupling hole 211 formed in the mounting bracket 210 coupled to the buckle transmission apparatus 100 and the fixing hole 3a of the vehicle body 3, so that the buckle transmission apparatus 100 is coupled to the vehicle body 3.

Figure 7:
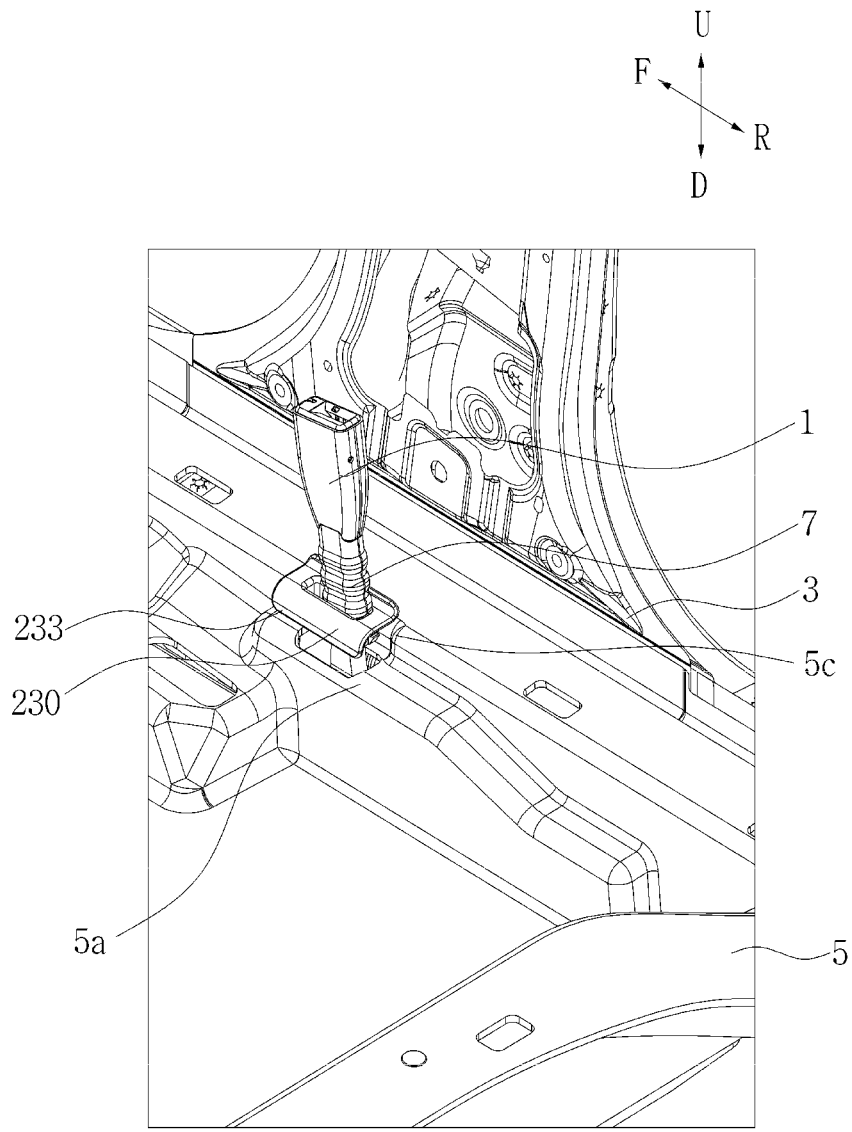
FIG. 7 is a partial perspective view showing the state that the floor cover structure is mounted on the floor of the vehicle according to one embodiment of the present invention.
Figure 8:
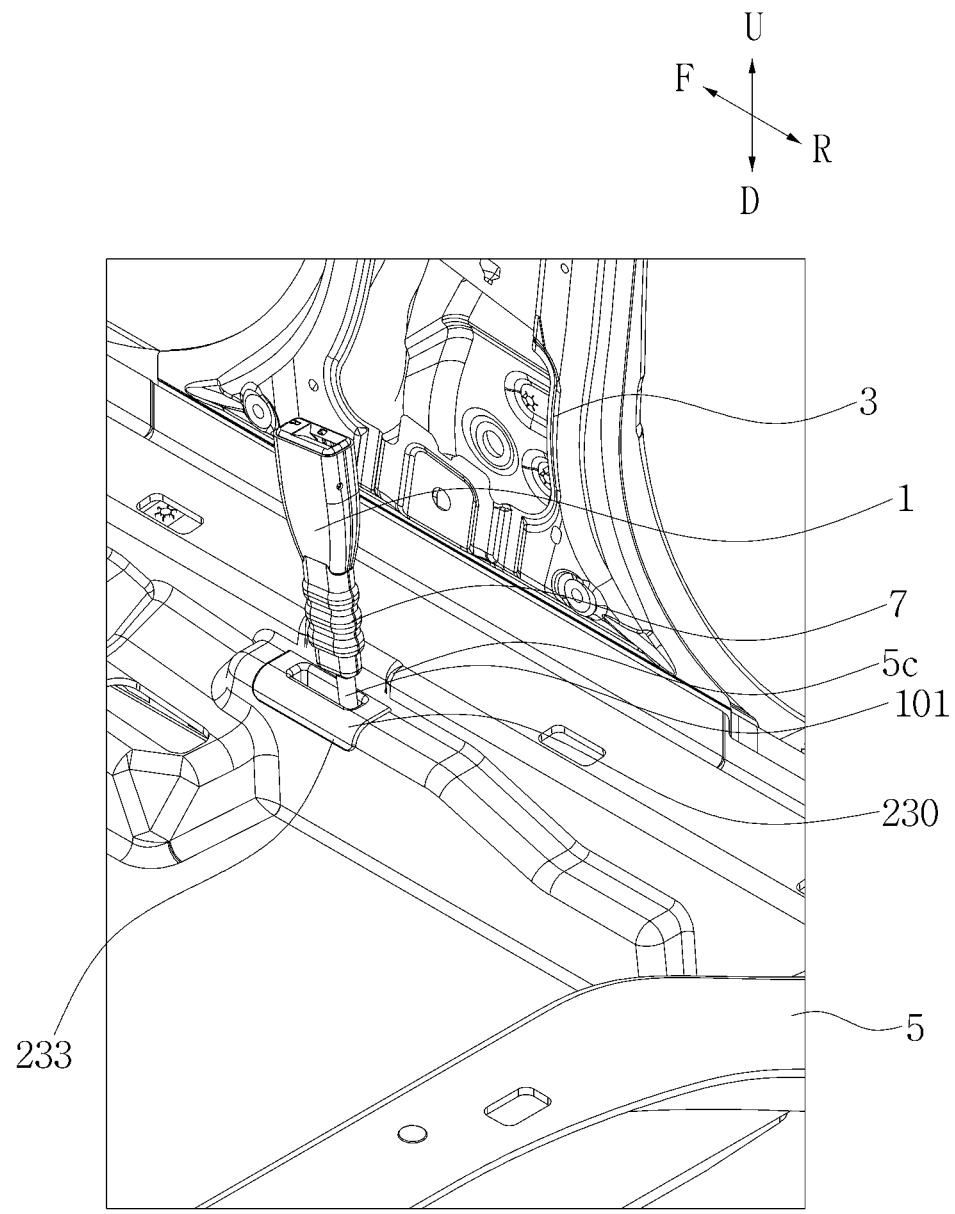
FIG. 8 is a perspective view showing the state that the cover member is assembled with the floor cover structure according to one embodiment of the present invention.

FIG. 7 is a partial perspective view showing the state that the floor cover structure is mounted on the floor of the vehicle according to one embodiment of the present invention. FIG. 8 is a perspective view showing the state that the cover member is assembled with the floor cover structure according to one embodiment of the present invention.

Referring to FIG. 7, the floor cover structure 5 is provided on the floor of the vehicle, and the buckle head 1 and the cover member 230 protrude from an upper portion of the bottom cover structure 5.

In this case, the buckle head 1 and the cover member 230 may protrude from the upper portion of the floor cover structure 5 through the cover hole 5a of the floor cover structure 5. The driving unit 110 (see FIG. 1) of the buckle transmission apparatus 100 is substantially positioned at the inner part of the floor cover structure 5.

For example, the cover hole 5a is provided in one side thereof with a slit 5c, so that the buckle head 1 and the cover member 230 can be easily withdrawn out of the floor cover structure 5. In other words, when the buckle head 1 and the cover member 230 are withdrawn through the cover hole 5a, the slit 5c is spread, so that the buckle head 1 and the cover member 230 can be easily withdrawn.

Referring to FIG. 8, the cover member 230 is fitted into the cover hole 5a of the floor cover structure 5 so that the flange part 233 of the cover member 230 is covered on the surface of the floor cover structure 5. The flange part 233 of the cover member 230 is formed corresponding to the surface of the floor cover structure 5, so that the flange part 233 can smoothly make contact with the surface of the floor cover structure 5.

Hereinafter, a procedure that the cover member 230 is inserted into the cover hole 5a of the cover structure 5 will be described in detail.

Referring to FIGS. 2 and 3, the fixing rib 236 protruding from one side of the cover member 230 is inserted into the cover hole 5a, so that the fixing rib 236 is locked with the inner part of the floor cover structure 5.

Referring to FIG. 4, the locking hook 237 formed at the opposite side of the cover member 230 is pressed toward the insertion part 231 and inserted into the cover hole 5a. The locking hook 237 is provided on the bottom surface of the flange part 233 and spaced apart from the insertion part 231 by a predetermined distance. In addition, one end of the locking hook 237 is supported, so that the locking hook 237 is smoothly moved toward the insertion part 231.

If the locking hook 237 is inserted into the cover hole 5a, the locking hook 237 is released from pressure applied by a worker, so that the locking hook 237 returns to an original state thereof. Accordingly, the locking step 237a of the locking hook 237 is locked to the inner surface of the floor cover structure 5.

According to one embodiment of the present invention, the cover member 230 is fitted into the floor cover structure 5, so that the structure of mounting the transmission apparatus 100 at a predetermined position of the interior of the vehicle can be simplified. Accordingly, the number of brackets to fix the buckle transmission apparatus to the vehicle body can be reduced, and the mounting work can be more easily performed.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A mounting apparatus for a buckle transmission apparatus, the mounting apparatus comprising:
   a mounting bracket to couple the buckle transmission apparatus, which comprises a transmission cable coupled to a buckle head and a driving unit coupled to the transmission cable to transmit the buckle head to a required position, to an internal side panel of a vehicle; and
   a cover member provided under the buckle head, allowing the transmission cable to pass the cover member, and fitted into a floor cover structure covering a floor of the vehicle,
   wherein the floor cover structure is formed therein with a cover hole into which the cover member is fitted,
   the cover member comprises a locking member locked into the floor cover structure; and
   the locking member comprises:
   a fixing rib protruding laterally from one side of the cover member such that when the cover member is inserted into the cover hole, the fixing rib comes into close contact with an inner surface of the floor cover structure; and
   a locking hook protruding downwardly from an opposite side of the cover member, formed moveably toward an insertion portion of the cover member, and having a locking step formed at a lower end thereof to be locked to the inner surface of the floor cover structure.

2. The mounting apparatus of claim 1, wherein the cover member comprises a flange part having a shape corresponding to an outer surface of a peripheral portion of the cover hole of the floor cover structure;
   the fixing rib protrudes laterally from a bottom surface of one side of the flange part; and
   the locking hook protrudes downwardly from the bottom surface of an opposite side of the flange part.

3. The mounting apparatus of claim 1, further comprising an extensible tube interposed between the buckle head and the cover member,
   wherein the extensible tube is provided at a lower end thereof with a locking protrusion locked to an inner circumference of an insertion hole formed in the cover member.

* * * * *